US006376111B1

United States Patent
Mathias et al.

(10) Patent No.: US 6,376,111 B1
(45) Date of Patent: Apr. 23, 2002

(54) SYSTEM AND METHOD FOR CONTROLLING THE HUMIDITY LEVEL OF A FUEL CELL

(75) Inventors: Mark F. Mathias, Pittsford, NY (US); Stephen A. Grot, Bear, DE (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/491,308

(22) Filed: Jan. 25, 2000

(51) Int. Cl.[7] .............................. H01M 8/04; H01M 8/10
(52) U.S. Cl. .............................. 429/13; 429/22; 429/23; 429/30
(58) Field of Search .............................. 429/13, 22, 23, 429/30

(56) References Cited

U.S. PATENT DOCUMENTS

| | | | |
|---|---|---|---|
| 4,876,115 A | 10/1989 | Raistrick | 427/115 |
| 5,211,984 A | 5/1993 | Wilson | 427/115 |
| 5,234,777 A | 8/1993 | Wilson | 429/33 |
| 5,272,017 A | 12/1993 | Swathirajan et al. | 429/33 |
| 5,316,871 A | 5/1994 | Swathirajan et al. | 429/33 |
| 5,620,807 A | 4/1997 | Mussell et al. | 429/33 |
| 5,783,324 A * | 7/1998 | Binder et al. | 429/31 |
| 6,083,638 A * | 7/2000 | Taniguchi et al. | 429/34 |
| 6,214,487 B1 * | 4/2001 | Kelley et al. | 429/23 |

FOREIGN PATENT DOCUMENTS

JP    7-282832 A  * 10/1995

OTHER PUBLICATIONS

Uchida et al., "New Preparation Method for Polymer–Electrolyte Fuel Cells," *J. Electrochem. Soc.*, vol. 142, No. 2, Feb. 1995, pp. 463–468.

* cited by examiner

*Primary Examiner*—Gabrielle Brouillette
*Assistant Examiner*—Jonathan Crepeau
(74) *Attorney, Agent, or Firm*—Karl F. Barr, Jr.; Linda M. Deschere

(57) ABSTRACT

A system for controlling the humidity level of a fuel cell is provided. The system includes a fuel cell, a humidifier for humidifying the fuel cell, and a controller for determining the humidity level of the fuel cell and controlling the humidifier in response to the determined humidity level. The resistance of the fuel cell varies as a function of the humidity level of the fuel cell. Thus, in a preferred system, the controller calculates the resistance of the fuel cell via measurements of AC preferred voltage and current components to determine the humidity level of the fuel cell. A method for controlling the humidity level of a fuel cell is also provided. The steps of the method include: determining the humidity level of the fuel cell, and humidifying the fuel cell in response to the determined humidity level.

19 Claims, 3 Drawing Sheets

SYSTEM AND METHOD FOR CONTROLLING THE HUMIDITY LEVEL OF A FUEL CELL

FIELD OF THE INVENTION

The present invention relates to a fuel cell and, more particularly, to a system and method for controlling the humidity level of a fuel cell.

BACKGROUND OF THE INVENTION

Fuel cells have been used as a power source in many applications. Fuel cells have also been proposed for use in electrical vehicular power plants to replace internal combustion engines. A solid-polymer-electrolyte fuel cell includes a membrane sandwiched in a layered relationship between an anode and a cathode. To produce electricity by way of an electrochemical reaction, hydrogen ($H_2$) is supplied to the anode and air or oxygen ($O_2$) is supplied to the cathode. In a first half-cell reaction, dissociation of the hydrogen ($H_2$) at the anode generates hydrogen protons ($H^+$) and electrons ($e^-$). The membrane is proton conductive and dielectric. As a result, the protons are transported through the membrane while the electrons flow through an electrical load connected across the electrodes. In this manner, electricity is produced. In a second half-cell reaction, oxygen ($O_2$) at the cathode reacts with protons ($H^+$), and electrons ($e^-$) are taken up to form water ($H_2O$).

To operate efficiently or, in other words, produce a maximum amount of electricity, the fuel cell must be properly humidified. As a result, the hydrogen stream and/or the air stream are typically humidified by one of several methods known in the art. However, known humidification methods are prone to providing too much or too little humidification to the fuel cell through the hydrogen and air streams. Providing too much humidity to the fuel cell blocks the access of the reacting gases to the catalyst thereby impeding the electrochemical reaction between the hydrogen and air and reducing the production of electricity. Providing too little humidity to the fuel cell restricts or limits the proton transportation required for reaction within the fuel cell. Accordingly, it would be desirable to provide a system and method for controlling the humidity level of a fuel cell.

SUMMARY OF THE INVENTION

The present invention provides a system for controlling the humidity level of a fuel cell. The system includes a fuel cell, a humidifier for humidifying the fuel cell, and a controller for determining the humidity level of the fuel cell and controlling the humidifier in response to the determined humidity level. The resistance of the fuel cell varies as a function of the humidity level of the fuel cell. Thus, in a preferred system, the controller calculates the resistance of the fuel cell to determine the humidity level of the fuel cell.

The present invention also provides a method for controlling the humidity level of a fuel cell. The steps of the method include: determining the humidity level of the fuel cell, and humidifying the fuel cell in response to the determined humidity level. In a preferred method, the step of determining the humidity level of the fuel cell includes calculating the resistance of the fuel cell.

BRIEF DESCRIPTION OF THE DRAWINGS

The various features, advantages and other uses of the present invention will become more apparent by referring to the following description and drawings in which.

DETAILED DESCRIPTION OF THE PREFERRED EMBODIMENT

Figure 1:
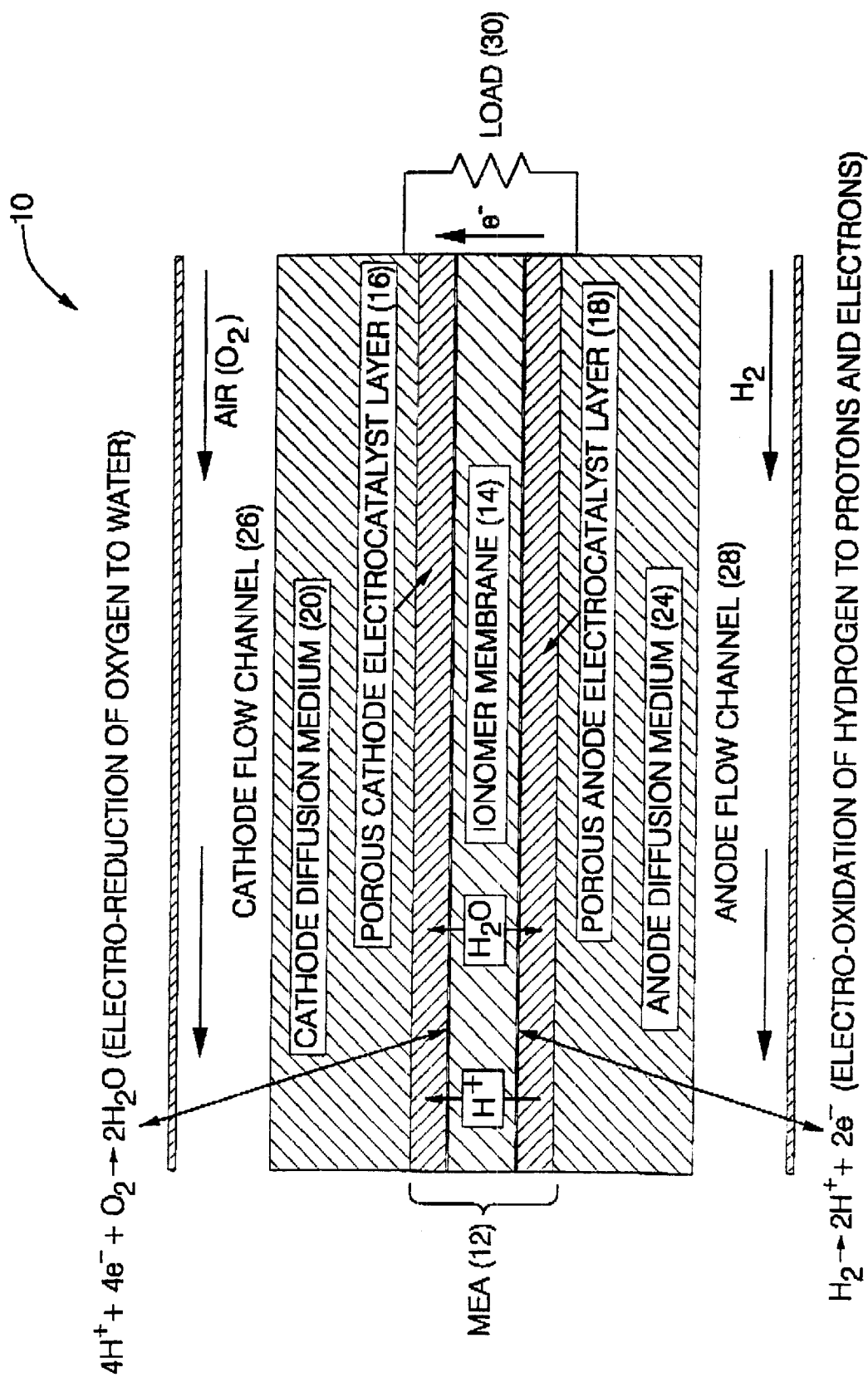
FIG. 1 is a pictorial illustration of a cross-section of a membrane electrode assembly of a fuel cell assembly.

FIG. 1 is a pictorial illustration of a cross-section of a membrane electrode assembly (MEA) 12 of a proton exchange membrane (PEM) fuel cell assembly 10. The membrane electrode assembly 12 includes a membrane 14, a cathode 16, and an anode 18. The membrane 14 is sandwiched in a layered relationship between the cathode 16 and the anode 18. A cathode diffusion medium 20 is layered adjacent to the cathode 16 opposite the membrane 14. An anode diffusion medium 24 is layered adjacent to the anode 18 opposite the membrane 14. The fuel cell assembly 10 further includes a cathode flow channel 26 and anode flow channel 28. The cathode flow channel 26 receives and directs oxygen or air ($O_2$) to the cathode diffusion medium 20. The anode flow channel 28 receives and directs hydrogen ($H_2$) to the anode diffusion medium 24.

In the electrochemical fuel cell 10, the membrane 14 is a cation permeable, proton conductive membrane having $H^+$ ions as the mobile ion; the fuel gas is hydrogen ($H_2$); and the oxidant is oxygen or air ($O_2$). The overall cell reaction is the oxidation of hydrogen to water and the respective reactions at the anode 18 and the cathode 16 are as follows:

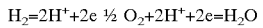

Since hydrogen is used as the fuel gas, the product of the overall cell reaction is water. Typically, the product water is rejected at the cathode 16 which is a porous electrode comprising an electrocatalyst layer on the oxygen side. Means, not shown, may be provided for collecting the water as it is formed and carrying it away from the MEA 12 of the fuel cell assembly 10.

The cell reaction produces a proton exchange in a direction from the anode diffusion medium 24 towards the cathode diffusion medium 20. In this manner, the fuel cell assembly 10 produces electricity. An electrical load 30 is electrically connected across the MEA 12 to the cathode diffusion medium 20 and the anode diffusion medium 24 to receive the electricity.

To operate efficiently or, in other words, produce the maximum amount of electricity, the fuel cell assembly 10 must be properly humidified. Typically, one or both of the air stream supplied to the cathode flow channel 26 and the hydrogen stream supplied to the anode flow channel 28 are humidified by one of several ways known in the art. In a common approach, the anode gases and/or cathode gases are directed to a membrane humidifier before they are directed to the fuel cell. The humidifier may be either external to the fuel cell or it may comprise a section within the fuel cell stack. In another approach, the fuel cell can also be humidified via use of water wicking materials, as disclosed in U.S. Pat. Nos. 5,935,725 and 5,952,119, that direct water from a reservoir to the MEA 12. Alternatively, steam or a mist of water ($H_2O$) may be injected into both the cathode stream and the anode stream to humidify these streams upstream of or within the fuel cell stack. In yet another approach, an oxygen stream may be injected in the hydrogen stream upstream of the anode flow channel 28 to react a small amount of $H_2$ to produce $H_2O$ to humidify the hydrogen stream.

Figure 2:
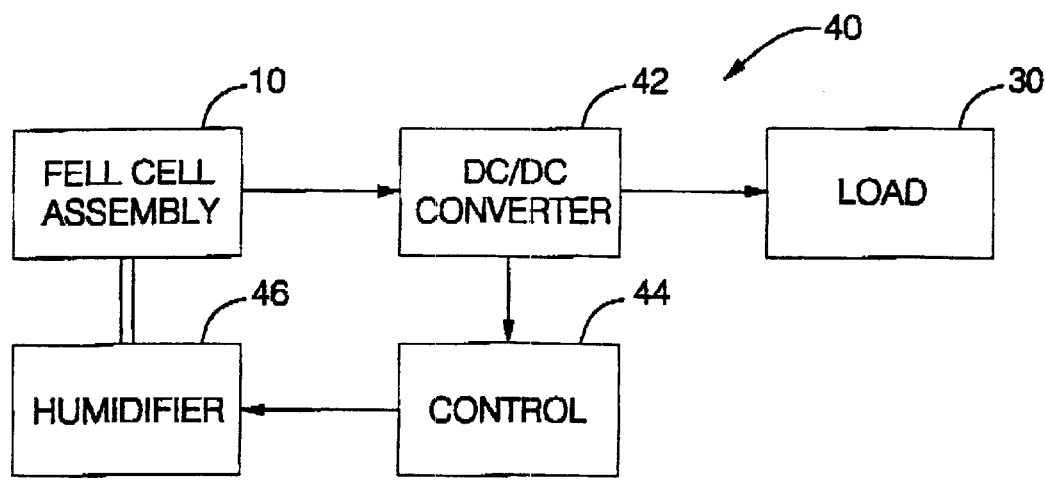
FIG. 2 is a schematic diagram of a system for controlling the humidity level of a fuel cell in accordance with the present invention.

FIG. 2 is a schematic diagram of a system 40 for controlling the humidity level of a fuel cell in accordance with the present invention. The system 40 includes the fuel cell assembly 10, a DC/DC converter 42, a controller 44, and a humidifier 46.

The fuel cell assembly 10 provides a DC current and a DC voltage, hereinafter referred to as the DC stack current and DC stack voltage, to the input of the DC/DC converter 42. The DC/DC converter 42 converts the DC stack current and DC stack voltage into a DC output current and DC output voltage. The DC output current and DC output voltage are connected to a load 30. The electronics of the DC/DC converter 42 generate a high frequency AC ripple on the DC output current and DC output voltage. The DC/DC converter 42 also imposes a high frequency AC ripple on the DC stack current and DC stack voltage. The AC stack ripple current component and AC stack ripple voltage component can be used to calculate the high frequency resistance of the fuel cell assembly 10. The AC stack ripple current component is an alternating signal of small amplitude relative to the DC stack current. The AC stack ripple voltage component is an alternating signal of small amplitude relative to the DC stack voltage. The frequency of the AC stack ripple current component and AC stack ripple voltage component is typically within the frequency range of 1–20 kHZ. Typically, the DC/DC converter 42 is a boost converter for increasing or boosting the voltage from the fuel cell assembly 10 up to a required operating range for an electric vehicle.

The humidifier 46 humidifies the fuel cell assembly 10 in one of the ways previously described. The controller 44 determines the humidity level of the fuel cell assembly 10 and controls the humidifier 46 in response to the determined or actual humidity level. In other words, the controller 44 utilizes feedback created by the DC/DC converter 42 to control the humidification of the fuel cell assembly 10.

In this system 40, the resistance of the fuel cell assembly 10 varies as a function of the humidity level of the assembly 10. More particularly, the high frequency resistance of the fuel cell membrane 14 varies as a function of the humidity level of the fuel cell assembly 40. Thus, the resistance of the fuel cell membrane 14 is utilized in the present invention as a measure of the humidity level of the fuel cell assembly 10. In a vehicle containing a stack or plurality of adjacent fuel cells, the system 40 may be designed to measure the entire stack, each fuel cell in the stack, preselected fuel cells, or a single fuel cell.

To calculate the high frequency resistance of the fuel cell membrane 14, the controller 44 measures the amplitude of the AC stack ripple current component and the amplitude of the AC stack ripple voltage component and divides the measured amplitude of the AC stack ripple voltage component by the measured amplitude of the AC stack ripple current component. In the event that the two AC signals are in phase, the high frequency resistance is equal to the AC voltage/AC current ratio. In the event that the two AC signals are out of phase, the phase angle between the two AC signals is monitored and the high frequency resistance of the fuel cell membrane 14 is represented by the real part of the impedance defined by the AC voltage/AC current ratio and the phase angle of the AC stack ripple voltage component relative to the AC stack ripple current component.

The controller 44 utilizes the calculated high frequency resistance of the fuel cell membrane 14 to employ a control strategy to keep the membrane 14 sufficiently humidified, but not flooded with water. In general, if the calculated high frequency resistance of the fuel cell membrane 14 is high or above a predetermined nominal value or range, then the membrane is too dry and the controller 44 is programmed to signal the humidifier to increase the amount of humidification to the fuel cell assembly 10. If the high frequency resistance of the fuel cell membrane 14 is low or below a predetermined nominal value or range and the fuel cell performance is substandard, then the membrane is flooded with water and the controller 44 is programmed to signal the humidifier to decrease the amount of humidification to the fuel cell assembly 10. The predetermined nominal value or range used to obtain optimum performance from a particular fuel cell varies with cell components and humidification strategy.

Flooding results in a loss of fuel cell performance as the excess water blocks the flow of reactant gas to the MEA. A fuel cell membrane may be fully saturated but not yet flooded. Experimentation has shown that the resistance of a membrane reaches a minimum value when the membrane is fully saturated. Observations have revealed that for certain types of fuel cells optimum performance will occur within a predetermined high resistance range between approximately 0.001 and 0.01 ohm $cm^2$ above the minimum high frequency resistance value for the membrane. Within this range, the membrane is well humidified and efficiently conducting protons but not yet in a flooded condition.

The controller 44 includes a comparator, or other similar type of device, for comparing the calculated high frequency resistance and the predetermined nominal high frequency resistance and determining the difference or deviation between the two resistance values. The deviation between the two resistance values is used by the controller 44 to adjust the amount of water provided by the humidifier 46 to the cathode flow channel 26 and the anode flow channel 28. In one embodiment, the deviation between the two resistance values is used by the controller 44 to locate the proper amount of humidification adjustment in a look-up table. In another embodiment, the deviation between the two resistance values is used to calculate the proper amount of humidification adjustment.

The present invention also provides a method for controlling the humidity level of a fuel cell. The steps of the method include: determining the humidity level of the fuel cell; and humidifying the fuel cell to a predetermined humidity level or within a predetermined range in response to the determined humidity level.

As previously described, the resistance of a fuel cell is a measure of the humidity level of the fuel cell. Thus, in a preferred method, the step of determining the humidity level of the fuel cell comprises determining the resistance of the fuel cell.

The fuel cell provides a DC current and a DC voltage. In one embodiment of the method, the step of determining the resistance of the fuel cell comprises the steps of: imposing an AC ripple current component on the DC current and an AC ripple voltage component on the DC voltage by way of a DC/DC converter; measuring the amplitude of the AC ripple current component and the amplitude of the AC ripple voltage component; and measuring the phase angle of the AC ripple current component and the phase angle of the AC ripple voltage component. When the two AC signals are in phase, the resistance of the fuel cell is calculated by dividing the amplitude of the AC ripple voltage component by the amplitude of the AC ripple current component. When the two AC signals are out of phase, the phase angle of the AC ripple voltage component relative to the AC ripple current component is determined and the resistance of the fuel cell is represented by the real part of the impedance defined by the AC ripple voltage component divided by the AC ripple current component and the phase angle of the AC ripple voltage component relative to the AC ripple current component.

Figure 3A:
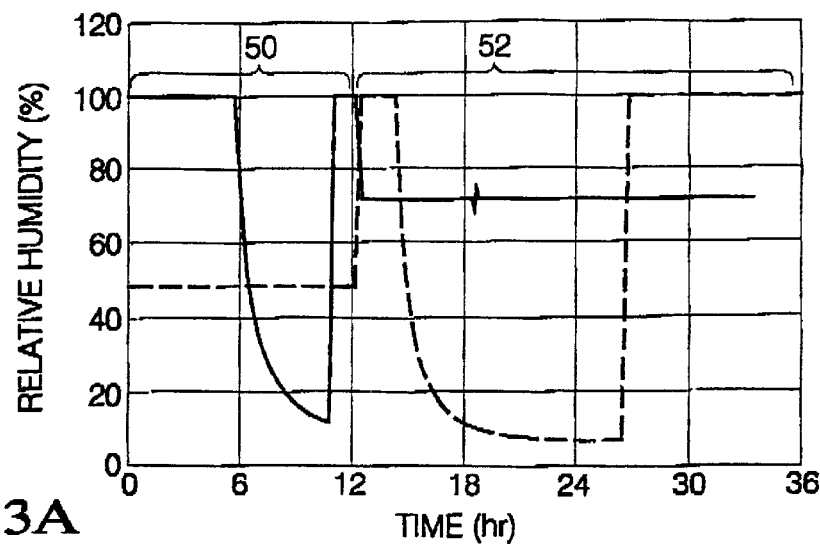
FIGS. 3A–3C are graphs illustrating the relationship between the humidity levels of fuel cell feed streams, the resistance of the fuel cell, and the voltage of the fuel cell respectively.
Figure 3B:
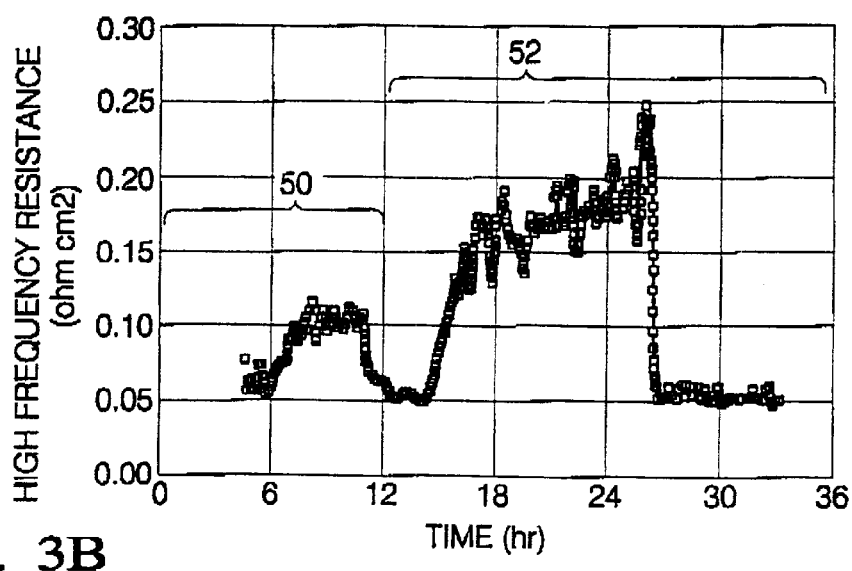
Figure 3C:
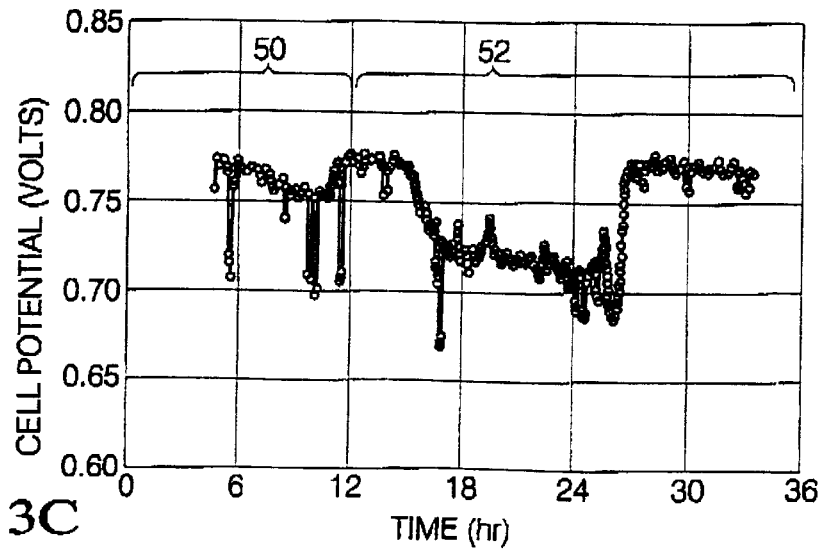

To demonstrate the effectiveness of the system and method, the present invention was simulated on a single-cell fuel cell having a 50 cm$^2$ active area. The fuel cell was operated under the following conditions: 80° C., 150 kPa absolute, 15 amps constant current, 100% hydrogen feed to the anode at 2.0 stoichiometry, air feed to the cathode with 2.0 oxygen stoichiometry. The humidification of the hydrogen inlet stream and the air inlet stream was varied, as shown in FIG. 3A, while the high frequency resistance of the fuel cell, as shown in FIG. 3B, and the voltage of the fuel cell, as shown in FIG. 3C, were monitored. Typically, the voltage of a fuel cell is a measure of the efficiency of the cell.

FIG. 3A is a graph of the humidity levels of the fuel cell inlet streams versus a predetermined time period. FIG. 3B is a graph of the high frequency resistance versus the same predetermined time period. FIG. 3C is a graph of the cell voltage versus the same predetermined time period. Thus, collectively FIGS. 3A–3C illustrate the relationship between the humidity level of a fuel c ell, the high frequency resistance of the fuel cell, and the efficiency of the fuel cell respectively.

The simulation consists of two portions, hereinafter referred to as Test Portion 1 and Test Portion 2. In FIGS. 3A–3C, Test Portion 1 is indicated generally by 50 and Test Portion 2 is indicated generally by 52. More specifically, Test Portion 1 was performed during the 0 to 12 hour time period and Test Portion 2 was performed during the 12 to 36 hour time period.

During Test Portion 1, the cathode humidification, represented in FIG. 3A with a dashed line, was held constant at 50% relative humidity and the anode humidification, represented in FIG. 3A with a solid line, was decreased from 100% to 12% relative humidity. In response to the decrease in anode humidification, the measured high frequency resistance of the fuel cell increased from its fully-humidified nominal value of approximately 0.05 ohm cm$^2$ to 0.10 ohm cm$^2$ and the cell voltage dropped from approximately 0.77 volts to approximately 0.75 volts due to insufficient water in the fuel cell.

During Test Portion 2, the anode humidification was raised and held constant at 73% relative humidity and the cathode humidification was decreased from 100% to about 10% relative humidity. In response to the decrease in cathode humidification, the measured high frequency resistance of the fuel cell increased from its fully-humidified nominal value of approximately 0.05 ohm cm$^2$ to 0.25 ohm cm$^2$ and the cell voltage dropped from approximately 0.77 volts to approximately 0.72 volts due to insufficient water in the fuel cell.

The performance of a fuel cell may or may not be substandard at the minimum high frequency resistance value of the fuel cell. For example, in this experiment the fuel cell had a minimum high frequency resistance value of 0.05 ohm cm$^2$ and no loss in fuel cell performance, or in other words decrease in fuel cell voltage, was observed when the high frequency resistance dropped to the minimum resistance value. However, if more water had been added to the inlet streams while the high frequency resistance was at the minimum resistance value, a flooded condition would have occurred resulting in a decrease in cell voltage. A decrease in the performance of a fuel cell due to flooding is best illustrated in FIG. 4.

Accordingly, this simulation verifies that the efficiency of a fuel cell is a function of the humidification of the fuel cell and that the high frequency resistance of a fuel cell is a measure of the humidity level of the fuel cell.

Figure 4:
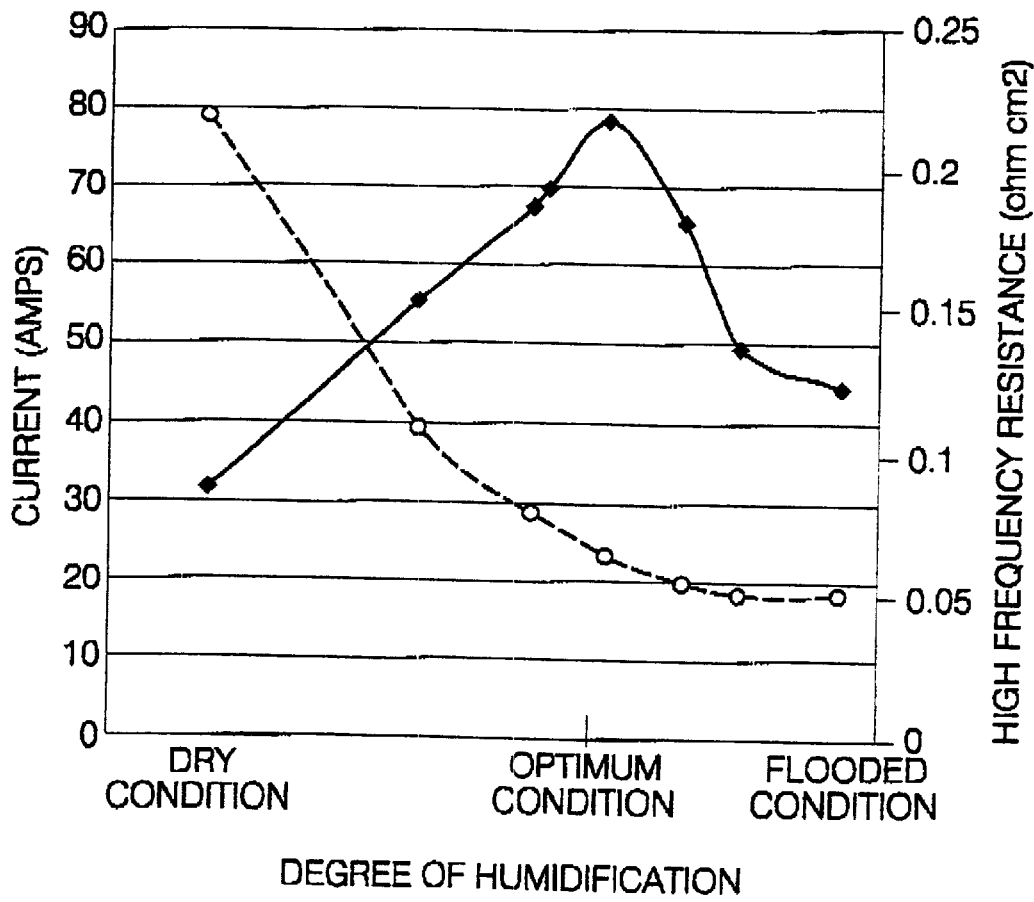
FIG. 4 is a graph illustrating the relationship between the current of a fuel cell and the high frequency resistance of the fuel cell at various feed stream humidity levels.

FIG. 4 is a graph illustrating the relationship between the current of a fuel cell, represented with a solid line, and the high frequency resistance of the fuel cell, represented with a dashed line, at various humidity levels. Data for FIG. 4 was obtained from a single-cell fuel cell with a 50 cm$^2$ active area. The fuel cell was operated under the following conditions: 80° C., 150 kPa absolute, 100% H$_2$ feed to the anode at 2.0 stoichiometry, air feed to the cathode with 2.0 oxygen stoichiometry. The relative humidity of the anode and the cathode were maintained equal to one another, and steady-state data was obtained at seven different humidification conditions. The fuel cell voltage was held constant at 0.6 volts while current and high frequency resistance were monitored. FIG. 4 shows the response of current and high frequency resistance to changes in the relative humidity of the anode and cathode inlet streams. At excessive humidification, labeled as the flooded condition in FIG. 4, the current dropped due to the presence of excess liquid water and blockage of the reaction gases. At low humidification, labeled as the dry condition in FIG. 4, the current dropped due to drying of the membrane as reflected by the increase in high frequency resistance during this condition. FIG. 4 illustrates that optimum operation of this particular fuel cell occurs at a high frequency resistance range of 0.06–0.07 ohm cm$^2$. Thus, maintaining the high frequency resistance within this range ensures optimum fuel cell performance.

Accordingly, this simulation verifies that each particular fuel cell has a high frequency resistance range within which the fuel cell operates most optimally or efficiently.

What is claimed is:

1. A system for controlling the humidity level of a fuel cell, comprising:
    a fuel cell that provides a DC current and a DC voltage;
    a humidifier for humidifying said fuel cell;
    a controller for determining the humidity level of said fuel cell and controlling said humidifier in response to said determined humidity level; and
    a DC/DC converter that imposes an AC ripple current component on said DC current and AC ripple voltage component on said DC voltage, wherein resistance of said fuel cell is calculated by said controller by dividing said AC ripple voltage component by said AC ripple current component.

2. The system as set forth in claim 1 wherein resistance of said fuel cell varies as a function of the humidity level of said fuel cell.

3. The system as set forth in claim 2 wherein said fuel cell includes a membrane and said controller calculates resistance of said membrane.

4. The system as set forth in claim 3 wherein said AC ripple voltage component and said AC ripple current component each have a phase angle and resistance of said membrane is represented by a real part of impedance defined by said AC ripple voltage component divided by said AC ripple current component and the phase angle of said AC ripple voltage component relative to the phase angle of said AC ripple current component.

5. The system as set forth in claim 1 wherein said controller maintains the humidity level of said fuel cell at a predetermined level.

6. The system as set forth in claim 1 wherein said controller maintains the humidity level of said fuel cell within a predetermined range.

7. A system for controlling the humidity level of a fuel cell, comprising:

a fuel cell for providing a DC current and a DC voltage;

a DC/DC converter imposing an AC ripple current component on said DC current and an AC ripple voltage component on said DC voltage;

a humidifier for humidifying said fuel cell; and a controller for measuring said AC ripple current component and said AC ripple voltage component, determining the humidity level of said fuel cell, and controlling said humidifier in response to said determined humidity level.

8. The system as set forth in claim 7 wherein resistance of said fuel cell varies as a function of the humidity level of said fuel cell.

9. The system as set forth in claim 8 wherein said controller calculates resistance of said fuel cell by dividing said AC ripple voltage by said AC ripple current.

10. The system as set forth in claim 8 wherein said AC ripple voltage component and said AC ripple current component each have a phase angle and resistance of said fuel cell is represented by a real part of impedance defined by said AC ripple voltage component divided by said AC ripple current component and the phase angle of said AC ripple voltage component relative to the phase angle of said AC ripple current component.

11. The system as set forth in claim 7 wherein said controller maintains the humidity level of said fuel cell at a predetermined level.

12. The system as set forth in claim 7 wherein said controller maintains the humidity level of said fuel cell within a predetermined range.

13. A method of controlling the humidity level of a fuel cell, comprising the steps of:

providing a controller for determining the humidity level of the fuel cell;

humidifying the fuel cell in response to the determined humidity level;

operating said fuel cell to provide a DC current and DC voltage; and providing a DC/DC converter that imposes an AC ripple current component on said DC current and an AC ripple voltage component on said DC voltage, wherein resistance of said fuel cell is calculated by said controller by dividing said AC ripple voltage component by said AC ripple current component.

14. The method of claim 13 wherein the step of determining the humidity level of the fuel cell comprises determining the humidity level of the fuel cell as a function of the resistance of the fuel cell.

15. The method of claim 14 wherein the step of determining the humidity level of the fuel cell as a function of the resistance of the fuel cell comprises determining the resistance of the fuel cell.

16. The method of claim 15 wherein the step of determining the resistance of the fuel cell comprises the steps of measuring the amplitude of said AC ripple current component and the amplitude of said AC ripple voltage component; and dividing the amplitude of the AC ripple voltage component by the amplitude of the AC ripple current component.

17. The method of claim 15 wherein the step of determining the resistance of the fuel cell comprises the steps of measuring the amplitude of said AC ripple current component and the amplitude of said AC ripple voltage component; measuring the phase angle of the AC ripple current component and the phase angle of the AC ripple voltage component; dividing the amplitude of the AC ripple voltage component by the amplitude of the AC ripple current component; and determining the phase angle of the AC ripple voltage component relative to the AC ripple current component.

18. The method of claim 13 wherein the step of humidifying the fuel cell in response to the determined humidity level comprises humidifying the fuel cell to a predetermined level in response to the determined humidity level.

19. The method of claim 13 wherein the step of humidifying the fuel cell in response to the determined humidity level comprises humidifying the fuel cell within a predetermined range in response to the determined humidity level.

* * * * *